United States Patent
Ota

(10) Patent No.: US 7,437,810 B2
(45) Date of Patent: *Oct. 21, 2008

(54) MACHINE TOOL FACILITY EQUIPPED WITH A PALLET EXCHANGER

(75) Inventor: Hidenari Ota, Kanagawa (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 134 days.

This patent is subject to a terminal disclaimer.

(21) Appl. No.: 10/541,430

(22) PCT Filed: Dec. 3, 2004

(86) PCT No.: PCT/JP2004/018419

§ 371 (c)(1), (2), (4) Date: Jul. 5, 2005

(87) PCT Pub. No.: WO2006/059398

PCT Pub. Date: Jun. 8, 2006

(65) Prior Publication Data

US 2006/0260907 A1    Nov. 23, 2006

(51) Int. Cl.
*B23P 23/00* (2006.01)

(52) U.S. Cl. ............... 29/33 P; 198/346.1; 409/221

(58) Field of Classification Search ............ 29/33 P, 29/563; 483/14–15; 198/346.1, 345.3; 409/159, 409/161, 172–173, 221, 165, 167–168
See application file for complete search history.

(56) References Cited

U.S. PATENT DOCUMENTS 4,090,287 A * 5/1978 Selander .................... 29/563
4,480,738 A * 11/1984 Mattson ................... 198/346.1
4,679,286 A * 7/1987 Momoi et al. ............... 29/33 P
5,052,540 A * 10/1991 Matsuyama et al. ......... 29/33 P
5,172,464 A * 12/1992 Kitamura et al. ............. 29/563
5,205,806 A * 4/1993 Ishida et al. ................ 29/33 P
6,019,214 A * 2/2000 Herronen et al. .......... 198/465.1
6,826,821 B2 * 12/2004 Geiger et al. ............... 29/33 P
2002/0116805 A1 * 8/2002 Koike ....................... 29/33 P
2006/0130311 A1 * 6/2006 Kikuchi ...................... 29/563
2006/0260907 A1 * 11/2006 Ota ......................... 198/346.1

FOREIGN PATENT DOCUMENTS

| DE | 3115481 A1 | * 11/1982 |
| JP | 57-189748 A | * 11/1982 |
| JP | 61-071933 A | * 4/1986 |
| JP | 02-185341 A | * 7/1990 |
| JP | 04-025333 A | * 1/1992 |
| JP | 4-57635 A | 2/1992 |
| JP | 2000-167741 A | 6/2000 |
| JP | 2002-137138 A | 5/2002 |
| WO | WO 01/94071 | 12/2001 |
| WO | WO-02/00388 A1 | * 1/2002 |

* cited by examiner

*Primary Examiner*—Erica E Cadugan
(74) *Attorney, Agent, or Firm*—Paul & Paul

(57) ABSTRACT

A pallet P is moved in a vertically held state from a pallet-mounting surface vertically formed on a table 115 of a machine tool 101 onto a pallet-mounting surface of a pallet support member 17 that is vertically formed on a pallet exchanger 11. After a turning plate 15 is turned and indexed by 180° about the vertical axis, a pallet P' is moved from the pallet support member 17 onto the table 115.

6 Claims, 11 Drawing Sheets

MACHINE TOOL FACILITY EQUIPPED WITH A PALLET EXCHANGER

TECHNICAL FIELD

The present invention relates to a machine tool facility equipped with a pallet exchanger for exchanging pallets, in a vertically held state relative to a table or a pallet-mounting plate of a machine tool, that detachably attaches the pallet to a vertical plane.

BACKGROUND ART

There is a widely-used machine tool by which a pallet, to which a work has been fixed, is detachably attached to a table or a pallet-mounting plate of a machine tool. The machine tool employs a pallet exchanger for exchanging a work that has not been machined with a work that has been machined. The pallet exchanger that has heretofore been generally used mounts new and old pallets on arms that extend horizontally in opposite directions about a vertical rotary shaft, and exchanges the pallets by changing over the positions of the new and old pallets by turning the rotary shaft by 180°.

The above pallet exchanger is so constituted as to horizontally support the pallets. There has further been proposed a pallet exchanger which holds the pallet in a vertical manner.

For example, International Publication WO 01/94071 discloses a pallet-mounting plate which is disposed to face the end of the main spindle and to rotate about a horizontal axis. This pallet-mounting plate has two pallet-mounting surfaces arranged back to back, and exchanges the new and old pallets by turning the pallet-mounting plate about the horizontal axis by 180°.

U.S. Patent Publication 5,172,464 discloses a pallet magazine in which a plurality of radial pallet holders are arranged maintaining an equal angular distance about the rotary shaft extending in the horizontal direction neighboring the machine tool, and a pallet is attached to each pallet holder for fixing a work to each pallet holder. One pallet vertically supported by the pallet magazine is exchanged between the magazine and a vertical table of the machine tool.

However, neither the International Publication WO 01/94071 nor U.S. Patent Publication 5,172,464 discloses a pallet exchanger which vertically attaches the pallets to both side surfaces of the pallet support member that rotates about the vertical axis.

DISCLOSURE OF THE INVENTION

In a pallet exchanger, according to the above prior art, horizontally supporting the pallet on the arm that rotates about the vertical axis and in the pallet exchangers disclosed in International Publication WO 01/94071 and U.S. Patent Publication 5,172,464, the pallet itself is bulky to cope with a large work like a flat plate, an increased area is necessary for the pallet exchanging operation, and a large floor area is needed to install the pallet exchanger.

The present invention is intended to solve the above problems inherent in the prior art, and has an object of providing a machine tool facility equipped with a pallet exchanger which does not require a large floor area at the time of exchanging a pallet on which there can be attached a large work like a flat plate.

In order to achieve the above object according to the present invention, there is provided a machine tool facility equipped with a pallet exchanger for automatically exchanging the pallets mounted on a table or on a pallet-mounting plate, comprising:

a machine tool having a main spindle supported to rotate about a horizontal axis and for mounting a tool on the front end thereof, and a table or a pallet-mounting plate facing the front surface of the main spindle and for detachably attaching a pallet to a vertical surface, the the machine tool being designed to machine the work, i.e., workpiece, fixed to the pallet; and a pallet exchanger having a base provided neighboring the table or the pallet-mounting plate and serving as a base plate for the pallet exchanger, a pallet support member provided on the base so as to rotate about a vertical axis thereof in an indexing manner, having at least two vertical pallet-mounting surfaces and detachably mounting the pallet, and pallet-moving means for moving the pallet, in a vertical state, between the table or the pallet-mounting plate and the pallet support member to exchange the pallets.

The pallet is moved in a vertical state between the table or the pallet-mounting plate and the pallet support member so as to be exchanged, the pallet support member is rotated about the vertical axis to index a new pallet to the pallet-exchanging position, and the new pallet is moved in the vertical state onto the table or the pallet-mounting plate so as to be exchanged. As the pallet is moved and turned in the vertical state, a decreased floor area is required for the operation for exchanging the pallets.

There is further provided a machine tool facility equipped with a pallet exchanger, in which the pallet support member of the pallet exchanger is disposed at a position on an extension of the table or the pallet-mounting plate in a horizontal direction at right angles with the axis of the main spindle, and the pallet-mounting surface of the pallet support member on the pallet moving side is constituted to be in parallel with the pallet-mounting surface of the table or the pallet-mounting plate.

As the pallet support member is disposed at a position on an extension of the table or the pallet-mounting plate in a horizontal direction at right angles to the axis of the main spindle, the pallet undergoes the linear motion only. This constitution, too, helps decrease the floor area necessary for the operation of exchanging the pallets.

There is further provided a machine tool facility equipped with a pallet exchanger further having at least one pallet stocker provided neighboring the pallet exchanger to detachably hold the pallet in a vertical state, and to move the pallet in a vertical state by using the pallet-moving means in the radial direction of the rotary circle of the pallet support member so as to exchange the pallet relative to the pallet support member.

The pallet stocker is necessary when the pallets of a number in excess of the number of pallets supported by the pallet support member are to be moved to the machine tool. However, upon disposing the pallet stocker, at a position where the pallet can be exchanged, by moving it in the vertical state in the radial direction of the rotary circle of the pallet support member, the area for installing the machine tool facility as a whole can be decreased.

There is further provided a machine tool facility equipped with a pallet exchanger which is so constituted that the base of the pallet exchanger travels on a track laid in a horizontal direction at right angles to the pallet-mounting surface of the table or the pallet-mounting plate, that at least one pallet stocker detachably holding the pallets in the vertical state is disposed near the track and, after the pallet support member and the pallet stocker are aligned with each other, the pallet is moved in the vertical state and is exchanged between the pallet support member and the pallet stocker by the pallet-moving means.

As the pallet exchanger can travel on the track, the pallet can be moved in the vertical state relative to the many pallet stockers provided along the track, and the area for installing the machine tool facility as a whole can be decreased even when many pallet stockers are necessary.

There is further provided a machine tool facility equipped with a pallet exchanger which is so constituted that a plurality of machine tools are arranged on one side or on both sides of the track, and that the pallets are moved in the vertical state and are exchanged between a plurality of pallet stockers and the plurality of machine tools by the pallet exchanger traveling on the track.

As the pallets can be moved in the vertical state between the plurality of pallet stockers and the plurality of machine tools disposed on one side or on both sides of the track, the area for installing the machine tool facility as a whole can be decreased even when there are arranged the plurality of pallet stockers and the plurality of machine tools.

There is further provided a machine tool facility equipped with a pallet exchanger which is so constituted that the pallet exchanger can be mounted on either the fixed-type base with which the pallet support member and the pallet-moving means are used by being fixed onto the floor, or the traveling-type base with which the pallet support member and the pallet-moving means are used while traveling on the track.

A machine tool facility of a minimum constitution constituted by a machine tool and a pallet exchanger may be expanded into the one for moving the pallet exchanger on a track and employing an increased number of pallet stockers and machine tools. In this case, the base of the pallet exchanger is changed from the fixed-type base to the traveling-type base while utilizing the pallet support member and the pallet-moving means without alteration. The area for installing the machine tool facility as a whole can be decreased as small as possible, and the constitution of the machine tool facility can be easily changed.

According to the present invention, the pallet is moved, turned and is exchanged, in a state of being vertically held, between the pallet-mounting surface vertically formed on the table or the pallet-mounting plate of the machine tool and the pallet-mounting surface vertically formed on the pallet exchanger, whereby it is possible to decrease the area for installing the machine tool facility equipped with the pallet exchanger.

Even when pallet stockers are provided in an increased number or machine tools and pallet stockers are provided in increased numbers by employing the pallet exchanger of the traveling type in addition to increasing the number of the pallet exchangers, the area for installing the machine tool facility equipped with the pallet exchanger can be decreased to as small as possible.

BEST MODE FOR CARRYING OUT THE INVENTION

Preferred embodiments of the present invention will now be described with reference to the accompanying drawings.

Figure 1:
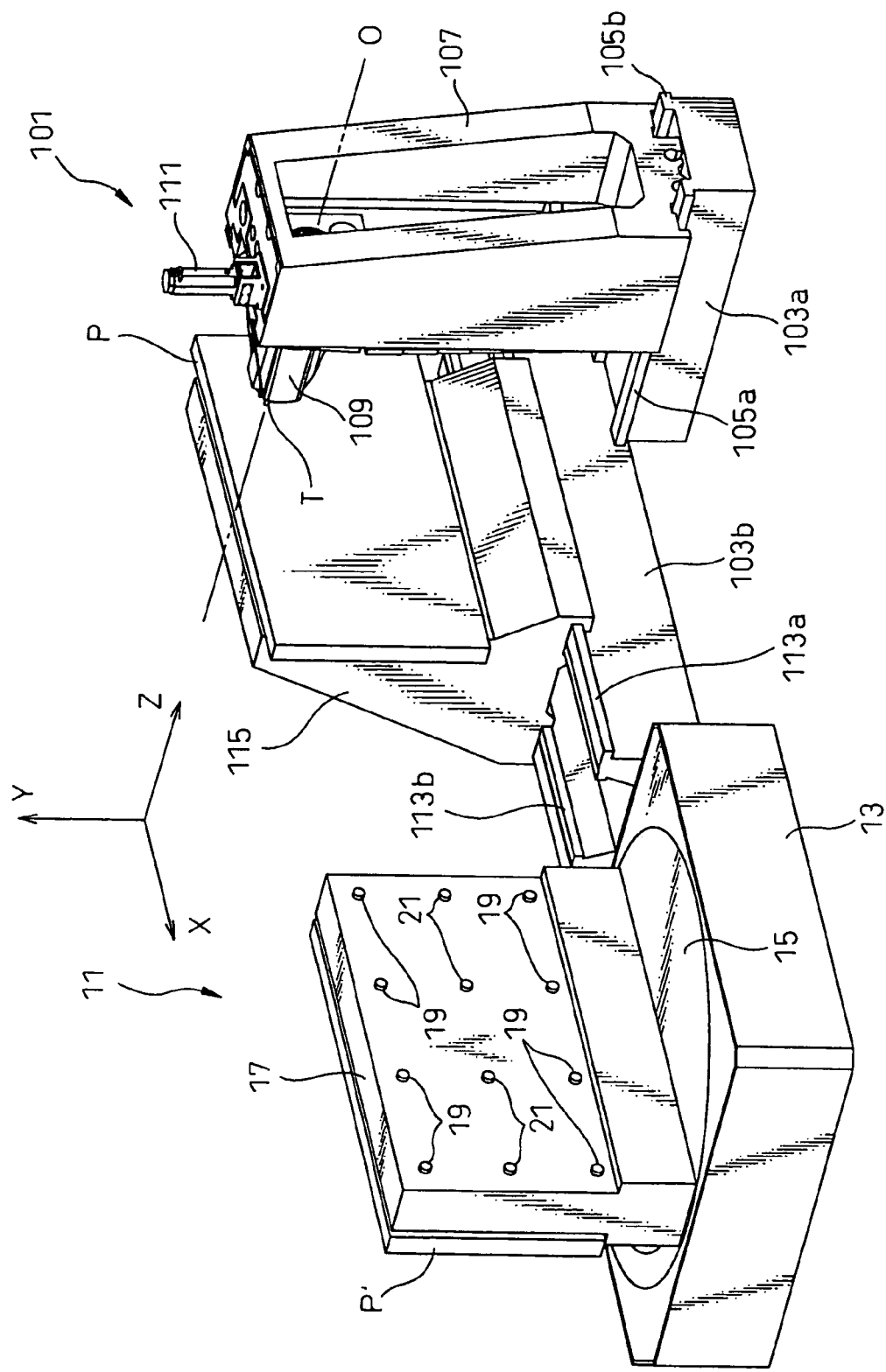
FIG. 1 is a perspective view illustrating a machine tool facility equipped with a pallet exchanger according to a first embodiment of the present invention.

Referring, first, to FIG. 1, a pallet exchanger 11 according to a first embodiment of the present invention is disposed near a machine tool 101, and exchanges the vertically arranged new and old pallets P, P' while maintaining the vertically arranged state. The machine tool 101 includes, as chief constituent elements, first and second beds 103a, 103b, a column 107 provided on the first bed 103a, a spindle head 109 provided on the column 107 and rotatably holds the main spindle (not shown), and a table 115 provided on the second bed 103b.

On the upper surface of the first bed 103a, Z-axis guide rails 105a and 105b extend in parallel with the rotary axis O of the main spindle, and the column 107 is provided so as to reciprocally move on the Z-axis guide rails 105a, 105b. Further, the machine tool 101 includes, as Z-axis feed means, a threaded shaft (not shown) extending through the first bed 103a in the Z-axis direction, a servo motor (not shown) coupled to an end of the threaded shaft, and a nut (not shown) provided at a lower end of the column 107 and is engaged with the threaded shaft.

The main spindle is supported by the spindle head 109 so as to rotate about the horizontal rotary axis O and is protruding in the Z-axis direction from the front surface of the column 107. On the tip of the main spindle, there is mounted a tool T via known tool-mounting means such as a tool holder (not shown) and a draw bar (not shown). On the front surface (not shown) of the column 107, there are extending a pair of parallel Y-axis guide rails in the vertical direction (Y-axis direction), and the spindle head 109 is mounted to the column 107 to reciprocally move along the Y-axis guide rails. The machine tool 101 includes, as Y-axis feed means, a threaded shaft (not shown) extending through the column 107 in the Y-axis direction, a servo motor 111 coupled to one end of the threaded shaft, and a nut (not shown) provided on the spindle head 109 and engaged with the threaded shaft. The spindle head 109 may be the one that is capable of executing the rotary feeding operation on at least any one of the A-axis which is the rotary feeding about the X-axis, B-axis which is the rotary feeding about the Y-axis or the C-axis which is the rotary feeding about the Z-axis.

In this embodiment, the second bed 103b forms a member separate from the first bed 103a and is disposed in front of the first bed 103a, i.e., on the side of the tip of the main spindle but being separated away therefrom. On the upper surface of the second bed 103b, there are extending a pair of parallel X-axis guide rails 113a, 113b in the X-axis direction perpendicular to the Y-axis and Z-axis. The table 115 is configured to reciprocally move on the X-axis guide rails 113a, 113b. The machine tool 101 includes, as X-axis feed means, a threaded shaft (not shown) extending through the second bed 103b in the X-axis direction, a servo motor (not shown) coupled to an end of the threaded shaft, and a nut (not shown) provided on the table 115 and engages with the threaded shaft. By means of the X-axis, Y-axis and Z-axis feed means, the machine tool 101 moves the work (not shown) on the pallet P attached to the table 115 and the tool T relative to each other in the orthogonal three-axial directions to machine the work.

Next, constitutions of the table 115 and the pallet P (P') will be described with reference to FIGS. 2 to 4. In addition, as the pallet P and the pallet P' have the same constitution, the following description deals with the pallet P only.

Figure 2:
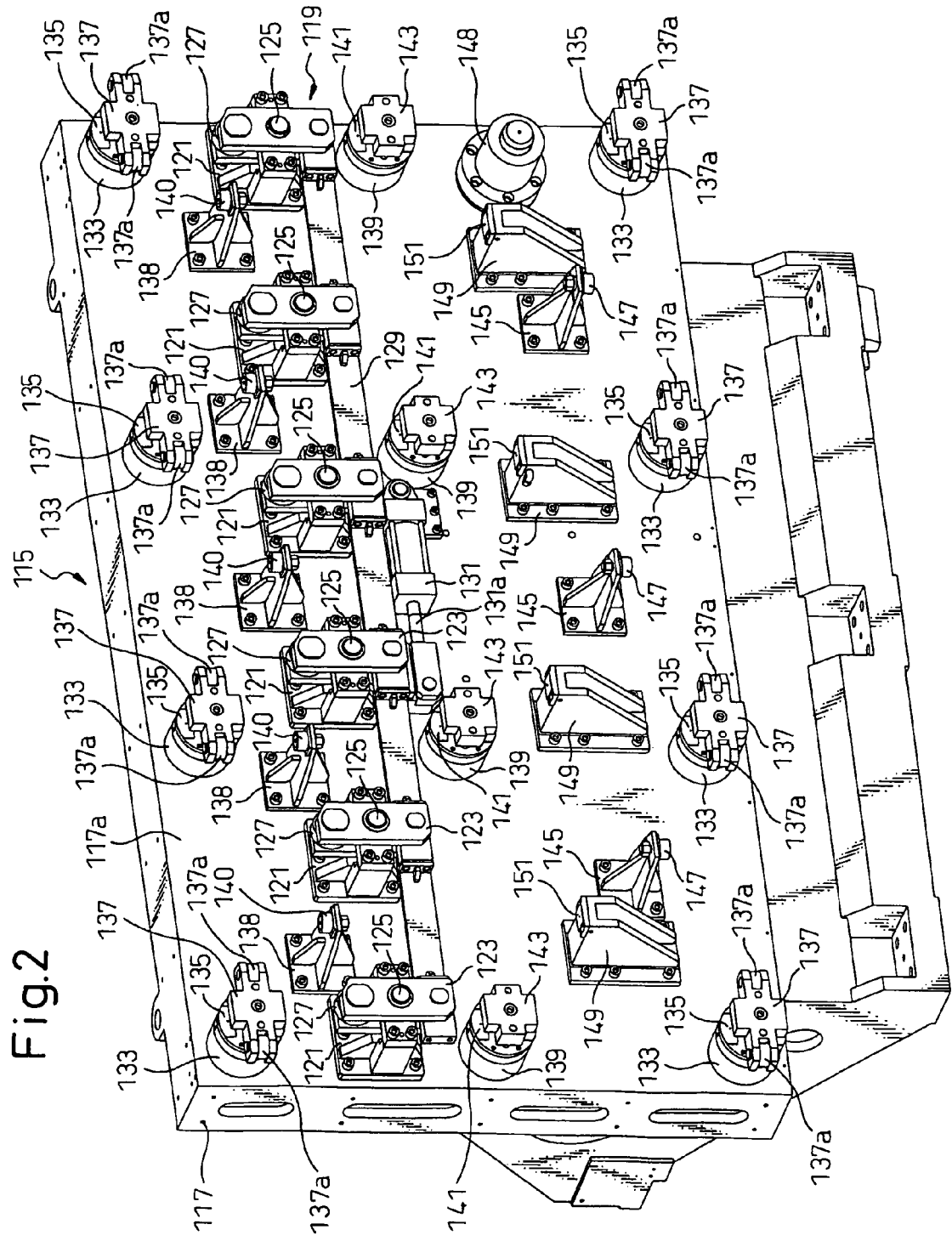
FIG. 2 is a perspective view of a table of a machine tool of FIG. 1.

In FIG. 2, the table 115 includes a member of a generally triangular shape as a whole in cross section provided with a plate member 117 having a pallet-mounting surface 117a which is a vertical plane facing the front surface of the main spindle. On the pallet-mounting surface 117a, there is arranged a lift means 119 for moving the pallet P up and down along the pallet-mounting surface 117a, a guide means for guiding the pallet P in the X-axis direction along the pallet-mounting surface 117a, a support means for supporting the pallet P in the Y-axis and Z-axis directions relative to the pallet-mounting surface 117a, and a clamp means for fixing the pallet P onto the pallet-mounting surface 117a. On the pallet-mounting surface 117a, there is further provided an engaging protuberance 148, as an X-axis positioning means for positioning the pallet P in the X-axis direction relative to the pallet-mounting surface 117a.

The lift means 119 includes a plurality of brackets 121 arranged along the pallet-mounting surface 117a maintaining a distance in the X-axis direction, link members 123 mounted on the brackets 121 to rotate about rotary shafts 125 extending in the Z-axis direction, lift rollers 127 mounted on the ends of the link members 123 on the upper side thereof so as to rotate about rotary shafts extending in the Z-axis direction, a connection member 129 connected to the ends of the link members 123 on the lower side thereof and extending in the X-axis direction, and a fluid cylinder, preferably a lift cylinder 131 including a pneumatic pressure cylinder, having a piston rod 131a connected to the connection member 129 which advances and retreats in the X-axis direction. Being constituted as described above, the lift means 119 moves the lift rollers 127 up and down between the lifted position shown in FIG. 2 and the support position where the link members 123 have turned by a predetermined angle in the counterclockwise direction in FIG. 2, according to the position of the piston rod 131a. The lift rollers 127 constitute portions of the lift means 119 and, at the same time, constitute portions of guide means that will be described later.

The guide means includes first horizontal guide rollers 137a and second horizontal guide rollers 140, 147 in addition to the lift rollers 127. The first horizontal guide rollers 137a are supported by a plurality of moving clamp members 137 arranged on the pallet-mounting surface 117a along the upper edge and the lower edge thereof maintaining a distance in the X-axis direction, so as to rotate about the rotary axes thereof extending in the Y-axis direction. The second horizontal guide rollers 140, 147 are supported by a plurality of brackets 138 arranged along the pallet-mounting surface 117a maintaining a distance in the X-axis direction under the moving clamp members 137 of the upper side, and by a plurality of brackets 145 arranged along the pallet-mounting surface 117a maintaining a distance in the X-axis direction above the moving clamp members 137 of the lower side, so as to rotate about the rotary axes thereof extending in the Y-axis direction, respectively. The movable clamp members 137 constitute portions of the guide means and, at the same time, constitute principal portions of clamp means that will be described later.

The support means includes a plurality of first and second horizontal support members 133, 139, as well as a plurality of vertical support members 149, mounted on the pallet-mounting surface 117a. The first horizontal support members 133 are arranged along the upper edge and the lower edge of the pallet-mounting surface 117a maintaining a distance in the X-axis direction, and the second horizontal support members 139 are arranged roughly along the center line of the pallet-mounting surface 117a maintaining a distance in the X-axis direction. The first and second horizontal support members 133, 139 have first and second horizontal support surfaces 135, 141, respectively, which are vertically formed so as to face to the pallet P mounted on the pallet-mounting surface 117a. The vertical support members 149 are arranged under the second horizontal support members 139 maintaining a distance in the X-axis direction, and have vertical support surfaces 151 which are horizontally formed facing upward.

Figure 4:
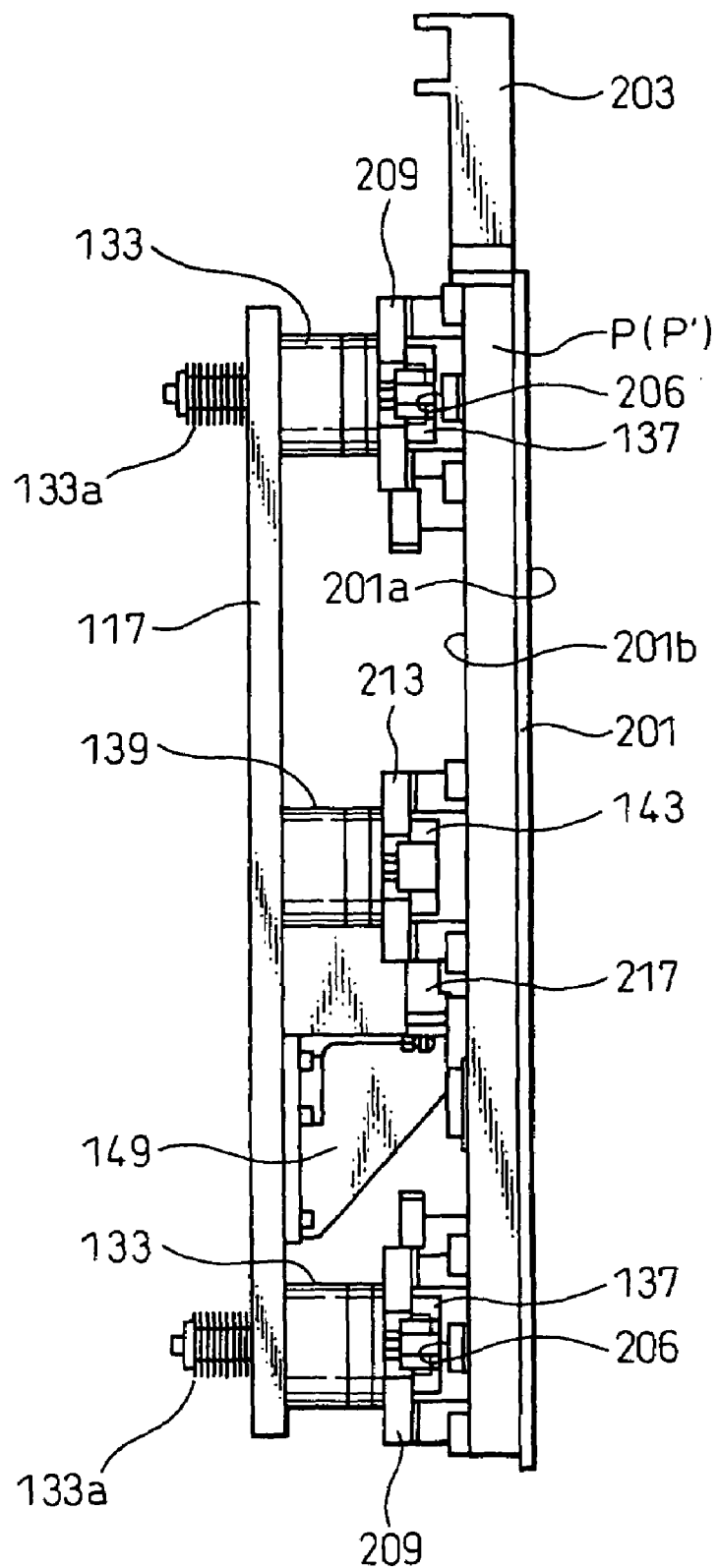
FIG. 4 is a sectional view illustrating a state where the pallet is clamped to the table.
Figure 5:
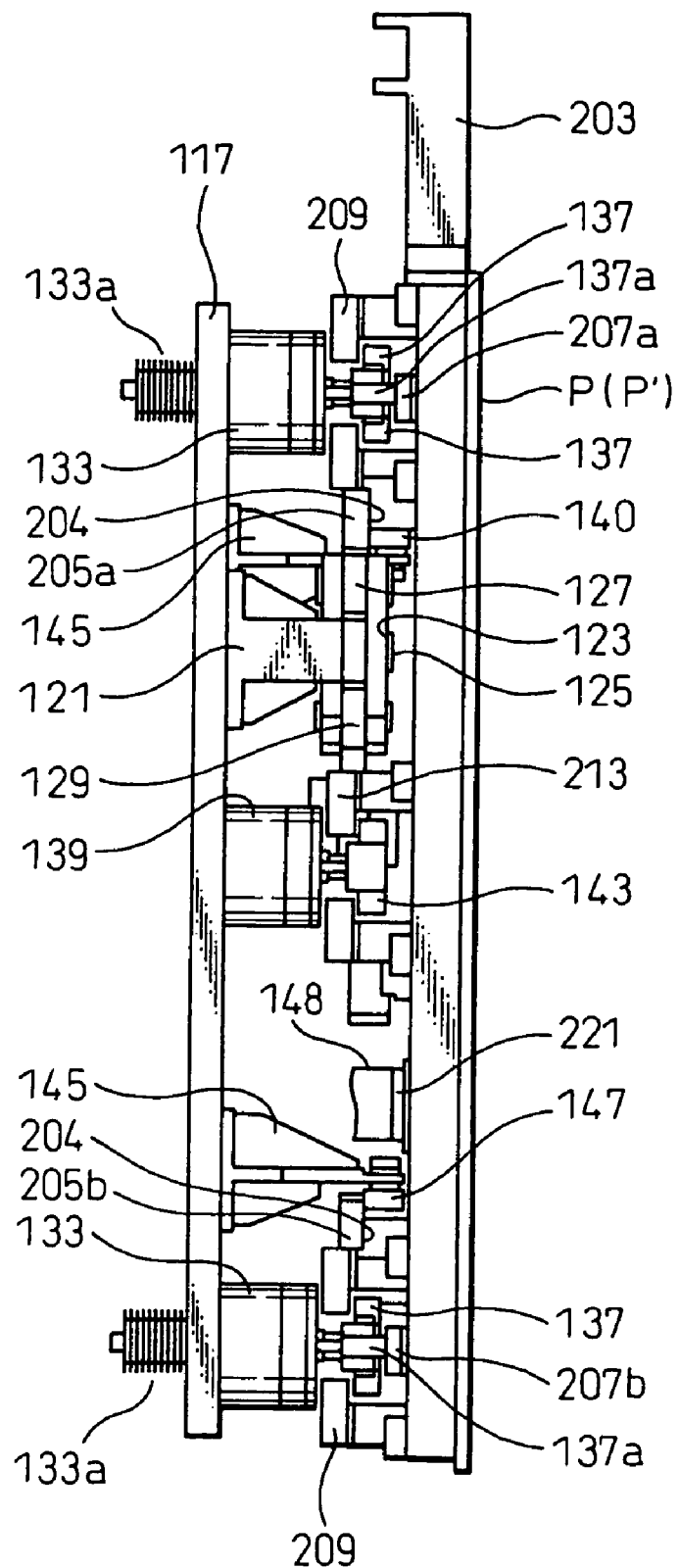
FIG. 5 is a sectional view illustrating a state where the pallet is unclamped from the table.

The clamp means includes moving clamp members 137, fluid cylinders, preferably, unclamping cylinders (not shown) including pneumatic pressure cylinders (not shown), for separating the moving clamp members 137 in the Z-axis direction away from the pallet-mounting surface 117a, clamp springs 133a (see FIGS. 4 and 5) as urging means for urging the moving clamp members 137 in a direction to approach the pallet-mounting surface 117a, and stationary clamp members 143 fixed to the horizontal support members 139. In this embodiment, the unclamping cylinders are incorporated in the first support members 133.

When the pallets P, P' and the work, i.e., workpiece, are relatively light in weight, the pallet may be directly supported by the lift rollers 127 which constitute the guide means, without providing the above-mentioned lift means or vertical support members.

Figure 3:
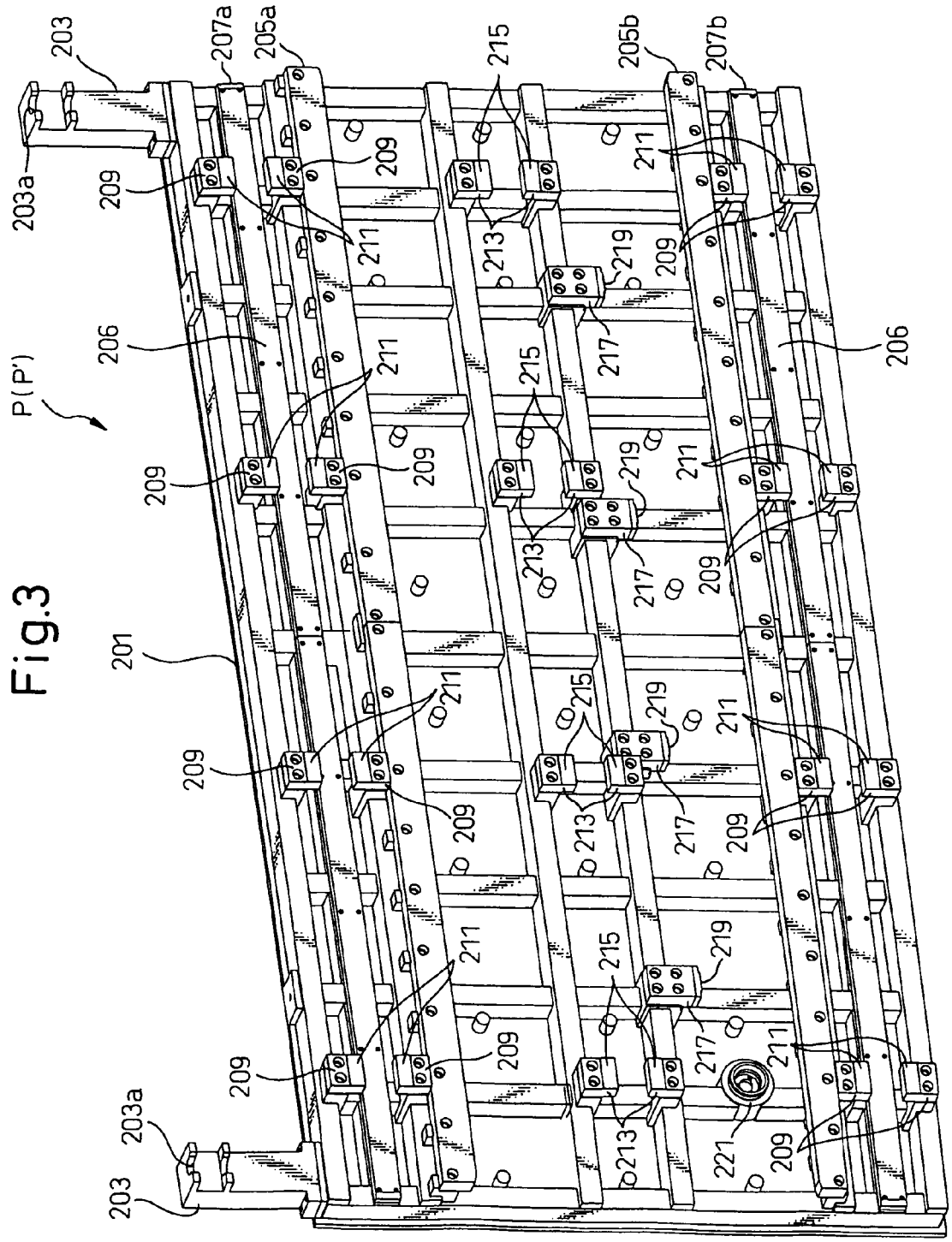
FIG. 3 is a perspective view of a pallet.

Next, referring to FIG. 3, the pallet P has a plate member 201 with a work-mounting surface 201a for mounting the work (not shown). The work-mounting surface 201a forms a vertical plane that faces the front surface of the main spindle when the pallet P is mounted to the pallet-mounting surface 117a. In the plate member 201, a surface on the opposite side to the work-mounting surface 201a forms a table surface 201b that faces the pallet-mounting surface 117a of the table 115. On the table surface 201b, there is arranged a guide means for guiding the pallet P along the pallet-mounting surface 117a in cooperation with the above guide means for the table 115, and a support means that comes in contact with the above support means. On the table surface 201b, there is further arranged a fitting portion 221 as a positioning means for positioning the pallet P relative to the pallet-mounting surface 117a in the X-axis direction upon engagement with the engaging protuberance 148 of the table 115.

The guide means for the pallet P includes a pair of first guide rails 207a, 207b extending in parallel along the upper edge and the lower edge of the table surface 201b, and a pair of second guide rails 205a, 205b extending in parallel with the first guide rails 207a, 207b. The first guide rails 207a, 207b have first guide surfaces 206 that come into contact with the first horizontal guide rollers 137a when the pallet P is mounted to the pallet-mounting surface 117a (see FIGS. 4 and 5). The second guide rails 205a, 205b have second guide surfaces 204 that come into contact with the second horizontal guide rollers 140, 147 when the pallet P is mounted to the pallet-mounting surface 117a. By referring to FIGS. 3 to 5, it will be seen that the first and second guide surfaces 206, 204 are formed facing opposite to each other in the Z-axis direction. Further, when the lift means 119 is located at the lifted position shown in FIG. 2, the lift rollers 127 are in contact with the lower end surface of the guide rail 205a between the second guide rails 205a and 205b, the guide rail 205a being arranged on the upper side when the pallet P is mounted on the pallet-mounting surface 117a (see FIG. 5).

The support means includes a plurality of first horizontal support members 209, a plurality of second horizontal support members 213 and a plurality of vertical support members 217, mounted on the table surface 201b of the pallet P. The first horizontal support members 209 are arranged on both sides of the first guide rails 207a, 207b at a distance in the X-axis direction, and have first horizontal support surfaces 211 configured to come into contact with the first horizontal support surfaces 135 of the first horizontal support members 133 when the pallet P is mounted to the pallet-mounting surface 117a (see FIGS. 4 and 5). The second horizontal support members 213 are arranged on both sides of roughly the center line of the pallet P in the X-axis direction thereof, and have second horizontal support surfaces 213 configured to come into contact with the second vertical support surfaces 141 of the second horizontal support members 139 when the pallet P is mounted to the pallet-mounting surface 117a (see FIGS. 4 and 5). The vertical support members 217 are arranged near the second horizontal support members 139, and have vertical support surfaces 219 configured to come into contact with the vertical support surfaces 151 of the vertical support members 149. The first horizontal support members 209 are, further, held or clamped between the movable clamp members 137 and the first horizontal support members 133 (see FIG. 5).

In the foregoing was described an embodiment in which the vertical pallet-mounting surface 117a was formed on the table 115. It is, however, also possible to fix a pallet-mounting plate having a vertical pallet-mounting surface onto the upper surface of the horizontal table, and provide the pallet-mounting plate with various members for detachably attaching the pallet described with reference to FIG. 2.

Figure 6:
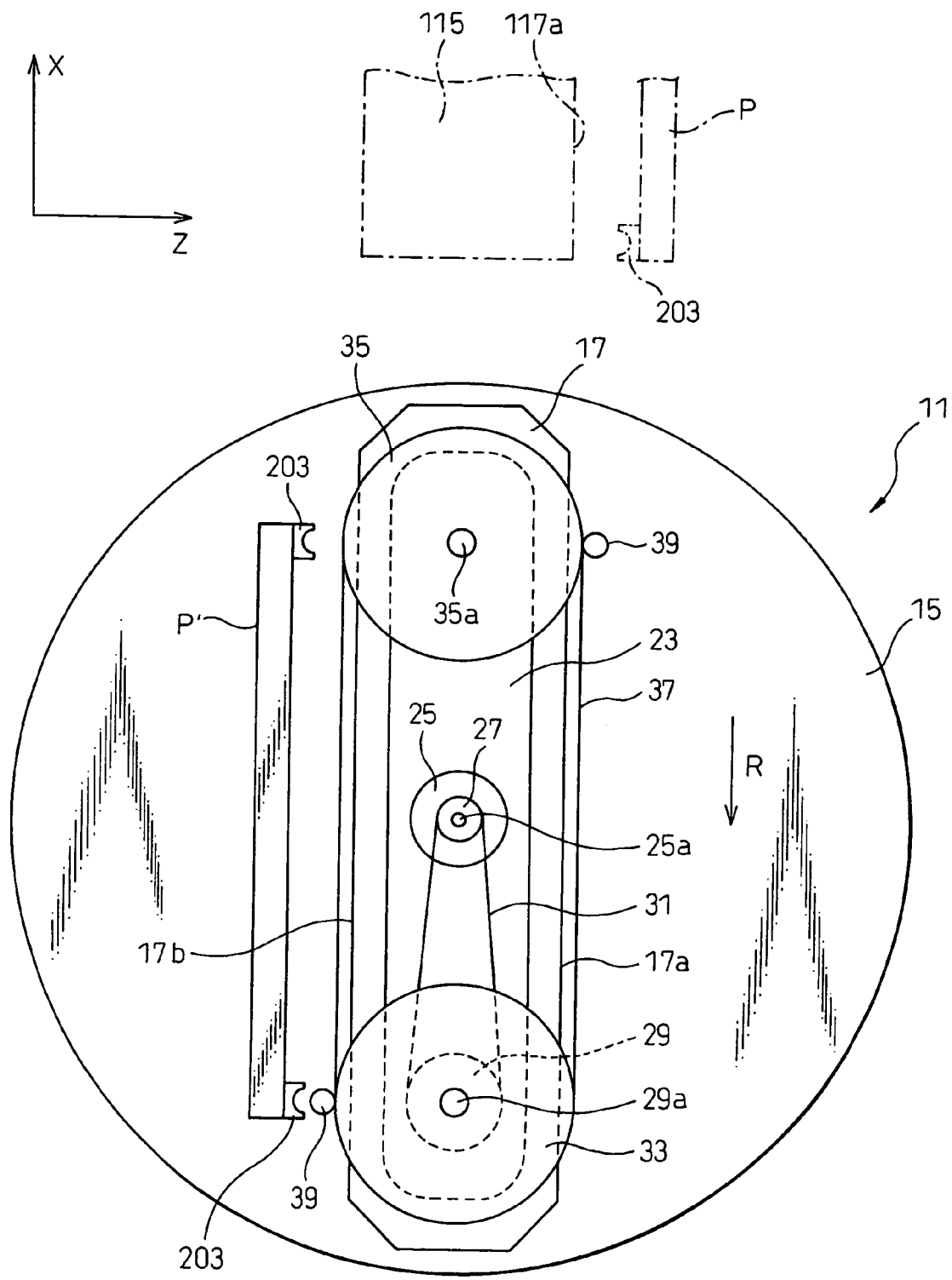
FIG. 6 is a plan view of a pallet exchanger.
Figure 7:
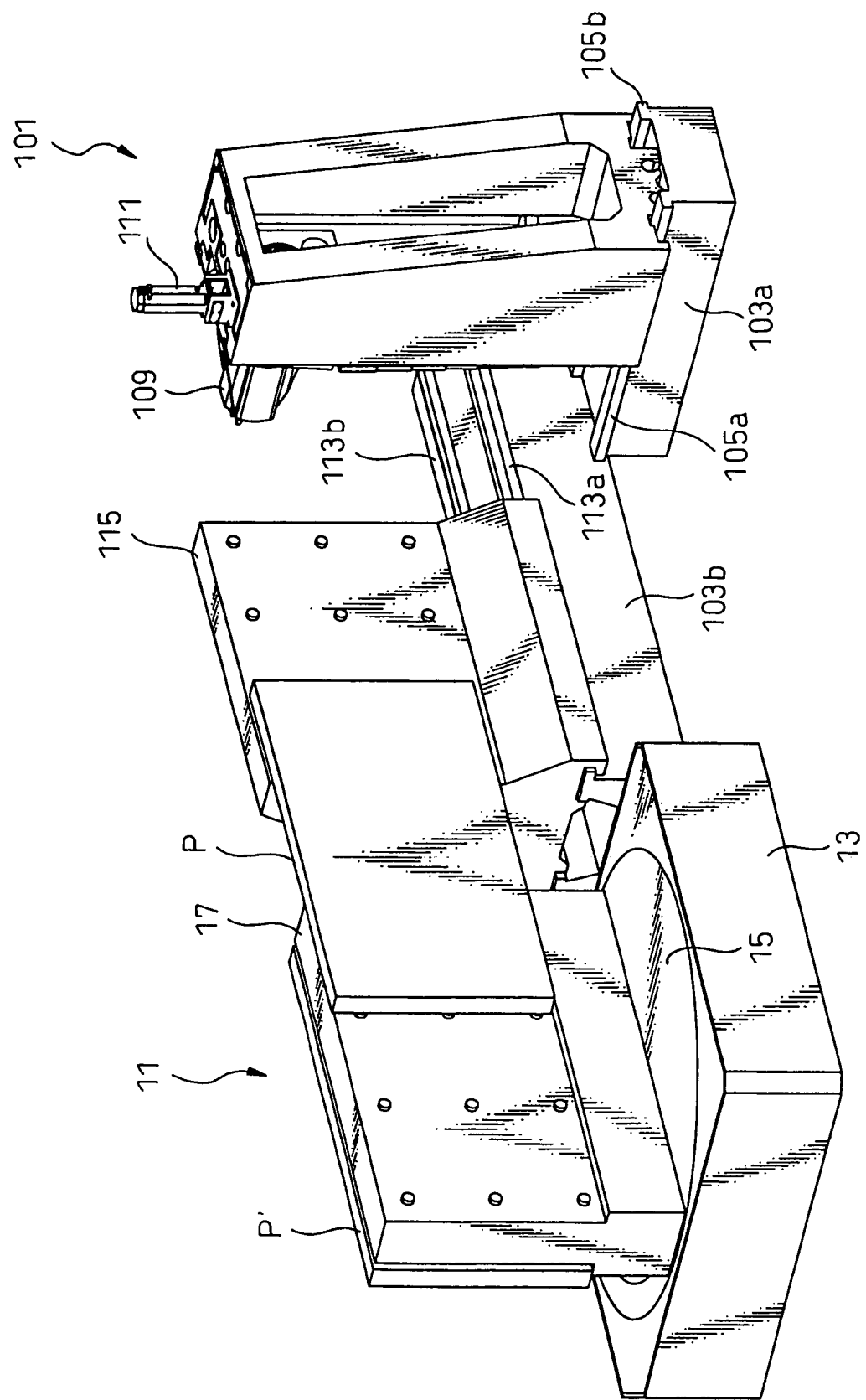
FIG. 7 is a perspective view illustrating the pallet exchanger together with the machine tool for explaining the operation for exchanging the pallet.
Figure 8:
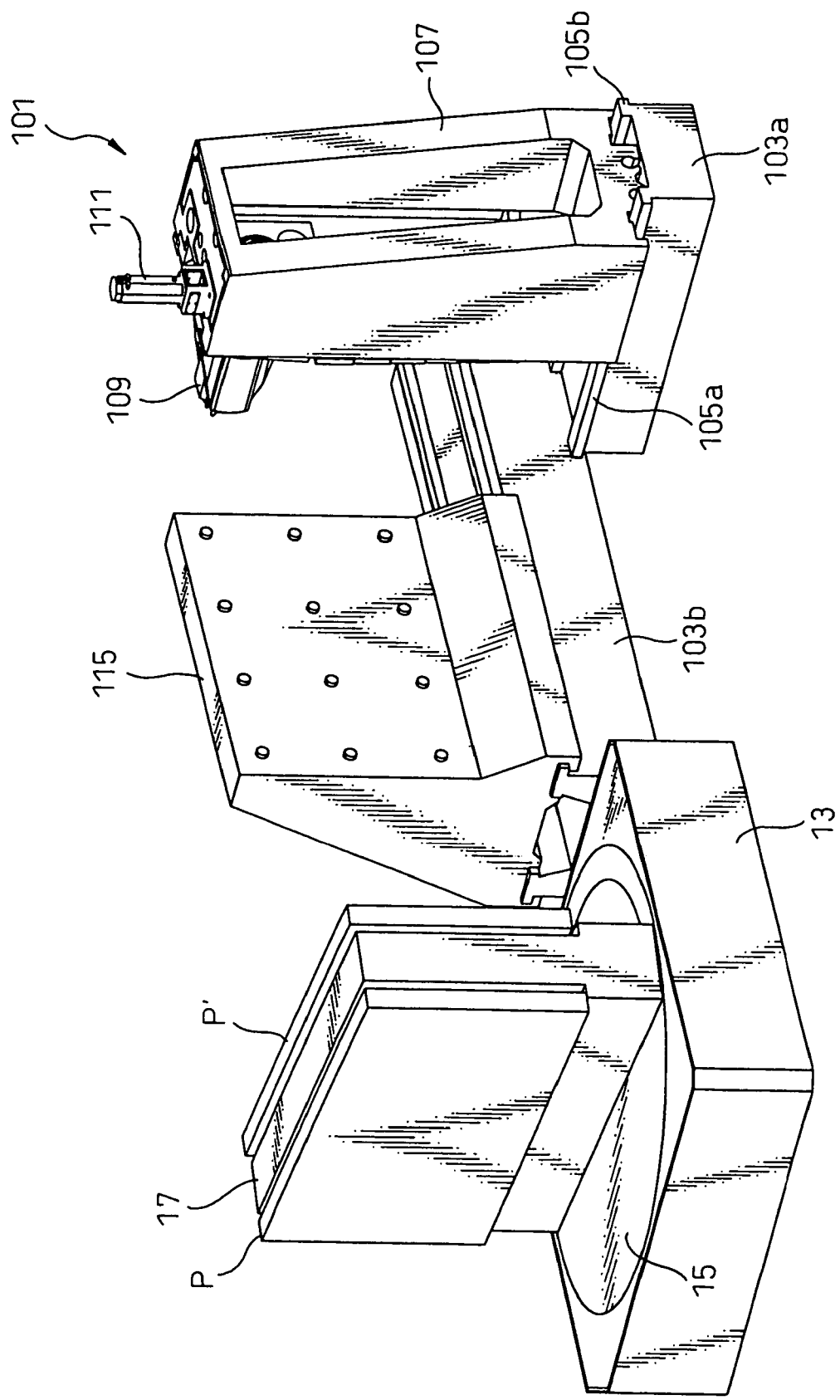
FIG. 8 is a perspective view illustrating the pallet exchanger together with the machine tool for explaining the operation for exchanging the pallet.
Figure 10:
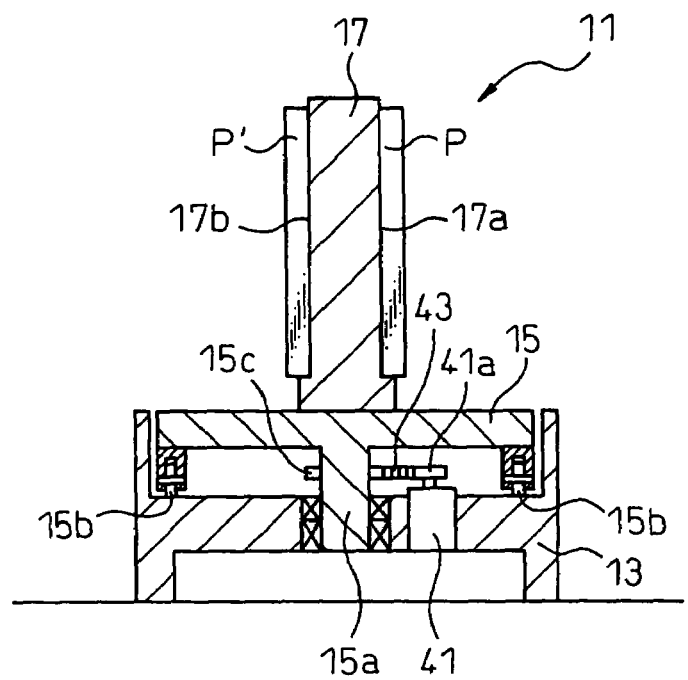
FIG. 10 is a sectional view of the pallet exchanger of the fixed type.

Next, referring to FIGS. 1, 6 and 10, the pallet exchanger 11 includes, as chief constituent elements, a base 13 which forms a base plate, a turning plate 15 provided to the base 13 so as to turn about the vertical axis, and a pallet support member 17 formed by a plate member erected on the turning plate 15 and for detachably mounting a piece of pallet on each side surface thereof. Both side surfaces of the pallet support member 17 serve as pallet-mounting surfaces 17a, 17b. As represented by reference numerals 19 and 21 in FIG. 1, on the pallet-mounting surfaces 17a and 17b, there are arranged such devices as the lift means 119 of the table 115, the guide means, the support means, the positioning means and the clamp means. In FIG. 1, further, a new pallet P' mounting the work (not shown) that has not been machined is attached to the pallet support member 17, and the old pallet P mounting the work (not shown) being machined or the work (not shown) that has been machined is attached to the table 115.

The turning plate 15 is provided on the base 13 so as to rotate with the center shaft 15a thereof extending downward, and supported by the base 13 through a bearing and with a plurality of rollers 15b rolling on the base 13. A chain 43 turns round a sprocket 15c attached to the center shaft 15a and round a sprocket 41a attached to an output shaft of a servo motor 41 mounted on the base 13, whereby the turning plate 15 is turned and indexed to be positioned.

The pallet exchanger 11 further has pallet-moving means for moving and exchanging the pallets P, P' between the pallet support member 17 and the table 115. Referring to FIG. 6, the pallet-moving means includes a plate-like movable base member 23 arranged at the top of the pallet support member 17, and a chain drive means mounted on the movable base member 23 and moves together with the movable base member 23. Due to a base drive mechanism, not shown, the movable base member 23 moves relative to the pallet support member 17 in the X-axis and Z-axis directions. The chain drive means includes a drive motor 25 having an output shaft 25a extending in the Y-axis direction, a drive sprocket 27 mounted to the output shaft 25a of the drive motor 25, a driven sprocket 29 mounted to a rotary shaft 29a provided in parallel with the output shaft 25a of the drive motor 25, a drive chain 31 stretched between the drive sprocket 27 and the driven sprocket 29, a first sprocket 33 attached to the rotary shaft 29a in concentric with the driven sprocket 29, a second sprocket 35 attached to the rotary shaft 35a extending in the Y-axis direction being disposed on the opposite side with the output shaft 25a of the drive motor 25 being sandwiched therebetween, a driven chain 37 stretched between the first sprocket 33 and the second sprocket 35 and rotated on the X-Z plane, and, an engaging portion 39 attached to the driven chain 37 so as to engage with a stopper portion 203 of the pallet P, P'.

The action of the embodiment will now be described with reference to FIGS. 1 and 7 to 9. The following description deals with a process for exchanging the pallet starting from a state (FIG. 1) where the machining of the work (not shown) fixed to the pallet P attached to the table 115 has been finished.

After the machining of the work is finished in FIG. 1, the machine tool 11 starts the operation for exchanging the pallets. That is, an X-axis feeder means is operated, first, and the table 115 moves along the X-axis guide rails 113a, 113b toward the pallet exchanging position where the pallets P, P' are to be exchanged relative to the pallet exchanger 11, i.e., toward the stroke end of the X-axis closest to the pallet exchanger 11, and is positioned. After the table 115 has arrived at the pallet exchanging position, the operation for unclamping the pallet starts as will be described later. Namely, in FIGS. 2 and 5, the operating fluid is fed to the unclamping cylinder (not shown), and the movable clamp members 137 approach the pallet P in the Z-axis direction against the urging forces of the clamp springs 133a. Therefore, the first and second horizontal support members 209, 213 may freely move though they had been held between the movable clamp members 137 and the first horizontal support members 133 and between the stationary clamp members 143 and the second horizontal support members 139. When the movable clamp members 137 further move forward to come into contact with the pallet P, the pallet P is urged by the movable clamp members 137 toward the direction (rightward in FIG. 5) to separate away from the table 115.

Simultaneously with or after the start of motion of the movable clamp members 137, the operating fluid is fed to the lift cylinder 131 and the piston rod 131a is extended. Therefore, the connection member 129 moves toward the left in FIG. 2, and the link members 123 rotate in the clockwise direction to move from the support position toward the lifted position shown in FIG. 2. Therefore, the lift rollers 127 of the lift means 119 come into contact with the lower end surface of the guide rail 205a of the upper side between the pair of second guide rails, and the pallet P moves upward and is held in the vertical direction by the lift rollers 127. Thus, the vertical support surfaces 219 of the vertical support members 217 separate away from the vertical support surfaces 151 of the vertical support members 149, whereby the pallet P may be moved in the horizontal direction.

After being permitted to move in the horizontal direction, the pallet P is urged by the movable clamp members 137 and separates away from the pallet-mounting surface 117a of the table 115, and the fitting portion 221 separates away from the engaging protuberance 148 to liberate the engagement between the two. Further, when the pallet P is urged by the movable clamp members 137, the first horizontal guide rollers 137a are pushed by the first guide surfaces 206 and the second horizontal guide rollers 140, 147 are pushed by the second guide surfaces 204. Thus, pushing forces of the same magnitude act in the opposite directions between the first horizontal guide rollers 137a and the first guide rails 207a, 207b and between the second horizontal guide rollers 140, 147 and the second guide rails 207a, 207b, whereby the pallet P is held so as to be moved in the X-axis direction but so as not to be moved in the Z-axis direction.

Simultaneously with, or after the start of, the operation of the above machine tool 101 for exchanging the pallets, a pallet exchange instruction is sent from the machine control unit to the pallet exchanger 11.

Upon receipt of the pallet exchange instruction, the pallet exchanger 11 rotates the turn base 15 and so positions the pallet support member 17 so that the surface 17a where no pallet P, P' has been mounted between the pallet-mounting surfaces 17a, 17b becomes parallel with the pallet-mounting surface 117a of the table 115, i.e., that the pallet-mounting surface 17a is arranged on the X-Y plane (see FIG. 6).

Next, the movable base member 23 starts moving to approach the table 115 in the X-axis direction. When the engaging member 39 arrives at a position where it can be brought into engagement with the stopper portion 203 of the old pallet P mounted on the table 115, the movable base member 23 stops and approaches the old pallet P in the Z-axis direction, whereby the engaging member 39 is brought into engagement with the engaging recessed portion 203a of the stopper portion 203. Next, as the movable base member 23 retreats in the X-axis direction, the drive motor 25 rotates in the clockwise direction in FIG. 6, and the driven chain 37 is turned in the direction of an arrow R, so that the old pallet P is drawn from the pallet-mounting surface 117a of the table 115 (see FIG. 7), i.e., so that the old pallet P moves onto the pallet-mounting surface 17a of the pallet support member 17. As described above, the pallet-mounting surface 17a has the same constitution as the pallet-mounting surface 117a of the table 115, and the old pallet P moved onto the pallet-mounting surface 17a of the pallet support member 17 is guided to a predetermined position on the pallet-mounting surface 17a and is fixed thereto due to a clamping operation the same as the clamping operation of the table 115, as described later. When the old pallet P is fixed to the pallet-mounting surface 17a, the movable base member 23 moves in the Z-axis direction to separate away from the old pallet P, and the engagement is liberated from the engaging member 39 and the stopper member 203.

Figure 9:
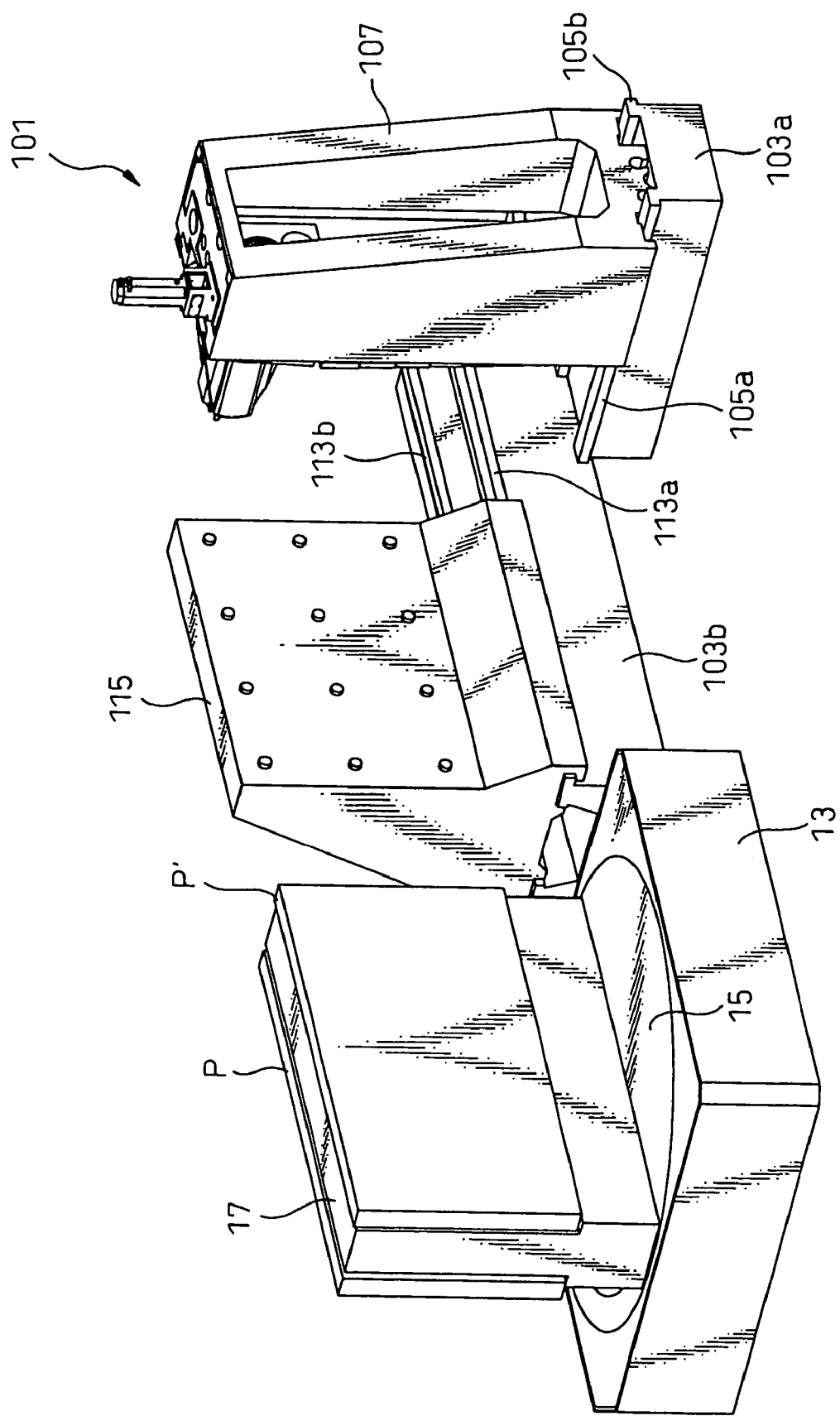
FIG. 9 is a perspective view illustrating the pallet exchanger together with the machine tool for explaining the operation for exchanging the pallet.

Next, the turn base 15 turns (see FIG. 8) to position the pallet support member 17 so that the pallet-mounting surface 17b mounting the new pallet P' is arranged on the X-Y plane (see FIG. 9). Next, the new pallet P' mounted on the pallet-mounting surface 17b of the pallet support member 17 is unclamped due to the same unclamping operation as the unclamping operation of the table 115 described above. The movable base member 23 approaches the new pallet P' in the Z-axis direction and, after the engaging member 39 has engaged with the stopper member 203 of the new pallet P', the movable base member 23 starts moving to approach the table 115 in the X-axis direction. Simultaneously with or immediately after the start of motion of the moving base member 23, the drive motor 27 rotates in the counterclockwise direction in FIG. 6, and the driven chain 37 is turned in the direction opposite to the arrow R. Therefore, the new pallet P' starts moving in the reverse direction along the moving path of the old pallet P extending from the pallet-mounting surface 117a of the table 115 to the pallet-mounting surface 17a of the pallet support member 17.

In this way, the new pallet P' moves from the pallet-mounting surface 17b of the pallet support member 17 onto the pallet-mounting surface 117a of the table 115. At this moment, the first horizontal guide rollers 137a come into contact with the first guide surfaces 206, the second horizontal guide rollers 140, 147 come into contact with the second guide surfaces 204, and, the lift rollers 127 come into contact with the lower end surface of the guide rail 205a of the upper side between the pair of second guide rails, whereby the new pallet P' is guided along the pallet-mounting surface 117a in the X-axis direction due to the contact between the guide rails and the rollers (see FIG. 5).

The movable base member 23 arrives at the predetermined position in the X-axis direction, the drive motor 25 rotates by a predetermined angle, and the new pallet P' arrives at a position where the fitting portion 221 serving as positioning means in the X-axis direction is brought into engagement with the engaging protuberance 148. The movable base member 23, thereafter, moves in the Z-axis direction to separate away from the new pallet P' and returns onto the pallet support member 17 of the pallet exchanger 11. At the same time, the table 115 starts clamping. That is, the operating fluid is no longer supplied to the lift cylinder 131 and the piston rod 131a retreats, whereby the link members 123 rotate about the rotary shafts 125 in the counterclockwise direction from the lifted position shown in FIG. 2 to the support position, and the lift rollers 127 move downward together with the new pallet P'. When the vertical support surfaces 219 of the vertical support members 217 come into contact with the vertical support surfaces 151 of the vertical support members 149, the lift rollers 127 separate away from the lower end surfaces of the first guide rails 205a, and the new pallet P' is supported in the vertical direction by the vertical support members 149 and is correctly positioned in the Y-axis direction.

Thereafter, the supply of the pressurized fluid to the unclamping cylinders (not shown) is interrupted, whereby the movable clamp members 137 approach the pallet-mounting surface 117a of the table 115 in the Z-axis direction due to the pressurized fluid supplied to the clamping cylinders (not shown). Therefore, the first horizontal support members 209 are pushed by the movable clamp members 137, the fitting portion 221 comes into engagement with the engaging protuberance 148, the new pallet P' is correctly positioned in the X-axis direction, the first horizontal support members 209 are clamped between the first horizontal support members 133 and the moving clamp members 137, the second horizontal support members 213 are clamped between the second horizontal support members 139 and the stationary clamp members 143, and the new pallet P' is horizontally supported by the first and second horizontal support members 133, 139 and is correctly positioned in the Z-axis direction. The clamp springs 133a are arranged for maintaining the new pallet P' not separated away from the table 115 when the power source is interrupted or in case of emergency stop.

While the new pallet P' is being clamped by the table 115 or thereafter, the pallet support member 17 turns by 180°, the old pallet P is moved to a position indicated by P' in FIG. 6, and the work that is machined mounted on the old pallet P is ready to be exchanged with the work that has not been machined. At this position, the operator mounts or removes the work onto or from the old pallet P.

Figure 12:
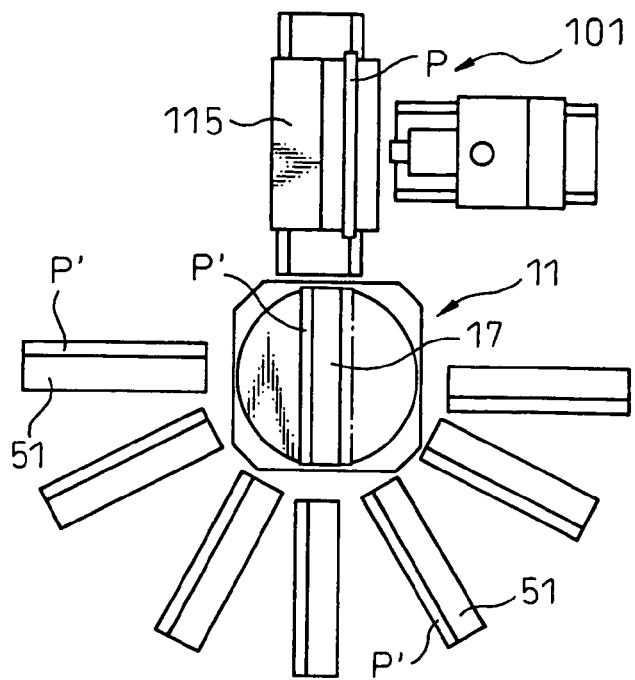
FIG. 12 is a plan view of a machine tool facility equipped with the pallet exchanger according to a second embodiment of the invention.

A second embodiment of the invention will be described next with reference to FIG. 12.

The second embodiment is one which is further provided with a pallet stocker 51 in addition to the machine tool 101 and the pallet exchanger 11 of the first embodiment. Referring to FIG. 12 which is a plan view, at least one pallet stocker 51 is arranged so as to face in the radial direction for a turning circle of the pallet support member 17 of the pallet exchanger 11. In FIG. 12, there are provided seven pallet stockers, and the pallets P' mounted on the pallet support member 17 are exchanged between the pallet support member 17 and the pallet stockers 51 by the pallet-moving means described above. On one side of each pallet stocker 51, there is provided the same mechanism as the above-mentioned pallet support member 17 for detachably holding the pallet in a vertical manner. The pallet support member 17 is so indexed and positioned by the servo motor 41 that the pallet-mounting surface of the pallet support member 17 becomes parallel to the pallet-mounting surface of the pallet stocker 51 and, thereafter, the pallet is moved.

Figure 13:
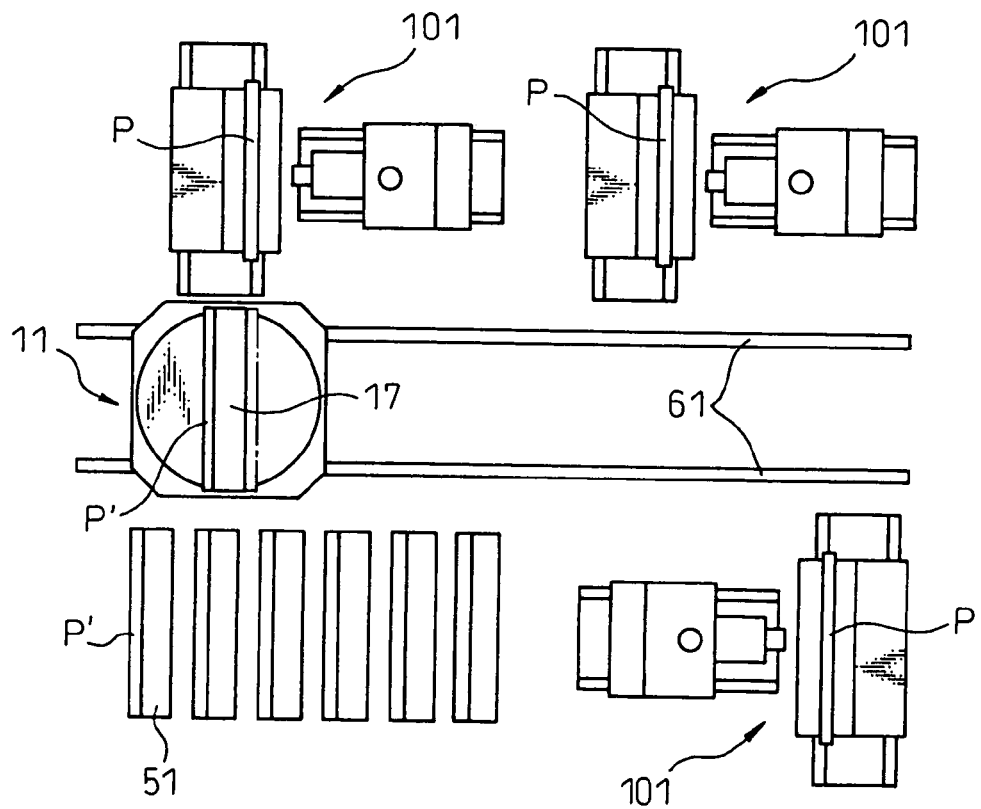
FIG. 13 is a plan view of the machine tool facility equipped with the pallet exchanger according to a third embodiment of the invention.

A third embodiment of the present invention will be described next with reference to FIG. 13.

Figure 11:
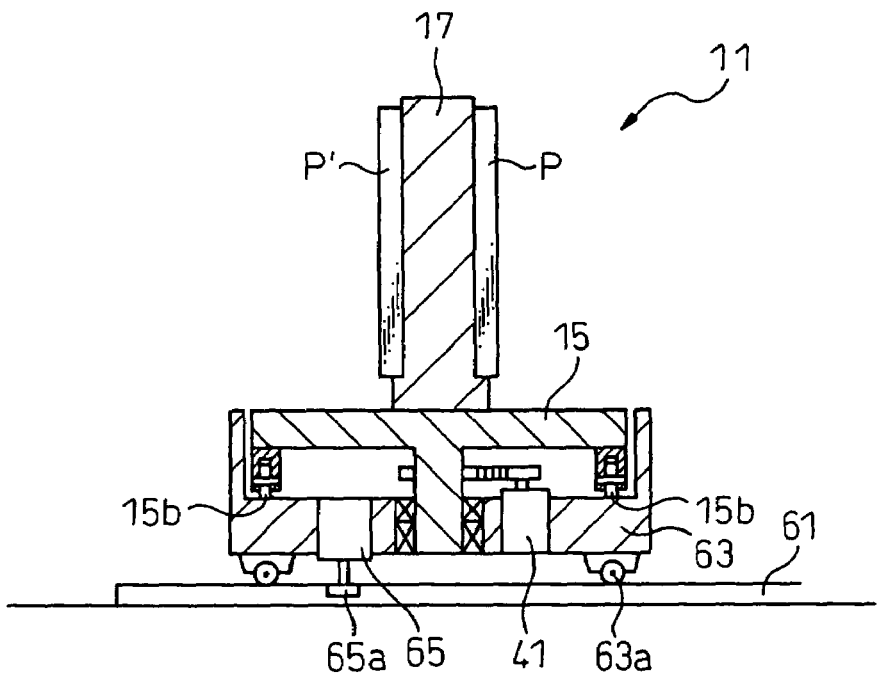
FIG. 11 is a sectional view of the pallet exchanger of the traveling type.

As shown in FIG. 11, the pallet exchanger 11 of the third embodiment can travel on a track 61 laid in a horizontal direction at right angles with the pallet-mounting surface of the table 115. This traveling-type pallet exchanger includes a traveling-type base 63, equipped with wheels 63a, mounting thereon the turning plate 15 and the pallet support member 17 that can be turned, indexed and positioned by the servo motor 41. The traveling-type base 63 is further provided with a servo motor 65. A pinion 65a is fastened to an output shaft of the servo motor 65 that is protruding downward, and is in mesh with a rack (not shown) laid in the longitudinal direction in parallel with the track 61 to accomplish the moving and the positioning. A total of three machine tools 101 and six pallet stockers 51 are arranged on both sides of the track 61 to constitute a machine tool facility equipped with the pallet exchanger. The pallet-mounting surface of each pallet stocker 51 is in parallel with the pallet-mounting surface of the table 115 of each machine tool 101. Due to this constitution, the pallets can be exchanged between each machine tool 101 and each pallet stocker 51.

When the machine tools 101 and the pallet stockers 51 are provided in plural numbers, it becomes difficult to maintain a strictly parallel relationship among the pallet-mounting surface of the table 115, pallet-mounting surface of the pallet support member 17 of the pallet exchanger 11 and pallet-mounting surface of the pallet stocker 51 at each pallet exchanging positions. Therefore, the parallel relationship may deviate to some extent. In this case, the servo motors 41 and 65 so execute the positioning as to eliminate deviation in the parallel relationship at each pallet exchanging position, enabling the pallets to move smoothly.

The base 13 described in the first and second embodiments is a fixed-type base used being fixed to the floor surface. The turning plate 15 of the fixed-type pallet exchanger provided on the base 13, the pallet support member 17 and the related members are removed from the fixed-type base 13, and are assembled on the traveling-type base 63 so as to be adapted to the traveling-type pallet exchanger. Therefore, the machine tool facility of the first and second embodiments introduced in the constitutions of FIGS. 1 and 12 can be easily remodeled into the machine tool facility of the third embodiment of the constitution of FIG. 13 without wasting many members.

The pallet exchanger 11 of the invention is provided with the turning-type pallet support member 17 having at least two pallet-mounting surfaces, readily turns after having received the old pallet P from the machine tool 101, moves the new pallet P' to the machine tool 101, shortens the time for exchanging the pallets relative to the machine tool, and shortens the non-grinding time spent while exchanging the pallets with the machine tool. It is further possible to install the machine tools on both sides of the track, to mount the pallets on another surface or on both surfaces of the pallet stocker, and to arrange the pallet stockers at the ends of the track, making it possible to obtain machine tool facilities with various constitutions. In the second embodiment of FIG. 12, the pallet stocker at the extreme left upper side serves as a preparatory station where the operator mounts the work on the pallet or removes the work therefrom. In the third embodiment of FIG. 13, the pallet stocker of the extreme left serves as the preparatory station.

The invention claimed is:

1. A machine tool facility equipped with a pallet exchanger for automatically exchanging pallets mounted on a table or on a pallet-mounting plate, comprising:
   a machine tool having a main spindle supported to rotate about a horizontal axis and for mounting a tool on the front end thereof, and the table or the pallet-mounting plate facing the front surface of the main spindle and for detachably attaching a pallet to a vertical surface of the table of a pallet-mounting face plate, the machine tool being designed to machine a work fixed to a vertical work-attachment surface of the pallet;
   the pallet exchanger having a base provided neighboring the table or the pallet-mounting plate and serving as a base plate for the pallet exchanger, a pallet support member provided on the base so as to rotate about a vertical axis thereof in an indexing manner, having at least two vertical pallet-mounting surfaces and detachably mounting the pallet, and pallet-moving means for moving the pallet, in a vertical state wherein the vertical work attachment surface remains vertical, between the table or the pallet-mounting plate and the pallet support member to exchange the pallets; and
   at least one pallet stocker provided near the pallet exchanger to detachably hold at least one of the pallets in the vertical state, and wherein the at least one pallet is moved in the vertical state by using the pallet-moving means so as to exchange the at least one pallet between the at least one pallet stocker and the pallet support member.

2. The machine tool facility as set forth in claim 1, wherein the pallet support member of the pallet exchanger is disposed at a position on an extension of the table or the pallet-mounting plate in a horizontal direction at right angles with the axis of the main spindle, and the pallet-mounting surface of the pallet support member on a pallet moving side is constituted to be in parallel with the pallet-mounting surface of the table or the pallet-mounting plate.

3. The machine tool facility as set forth in claim 1 or 2, wherein the movement of the at least one pallet in the vertical state between the at least one pallet stocker and the pallet support member occurs by using the pallet-moving means in a radial direction of a rotary circle of motion of the pallet support member.

4. The machine tool facility as set forth in claim 1, wherein the base of the pallet exchanger travels on a track laid in a horizontal direction at right angles with the pallet-mounting surface of the table or the pallet-mounting plate, the at least one pallet stocker detachably holding the at least one pallet in the vertical state is disposed near the track and, after the pallet support member and said at least one pallet stocker are aligned with each other, the at least one pallet is moved in the vertical state and is exchanged between the pallet support member and the at least one pallet stocker by the pallet-moving means.

5. The machine tool facility as set forth in claim 4, wherein a plurality of machine tools are arranged on one side or on both sides of the track, and the pallets are moved in the vertical state and are exchanged between a plurality of the pallet stockers and the plurality of machine tools by the pallet exchanger traveling on the track.

6. The machine tool facility as set forth in claim 1, wherein the pallet exchanger can be mounted on either a fixed-type base with which the pallet support member and the pallet moving means are used by being fixed onto the floor, or on a traveling-type base and the pallet support member and the pallet-moving means are used while traveling on a track.

* * * * *